Nov. 22, 1966 J. E. MOORE, JR 3,287,500

FIRE-INTRUSION AUTOMATIC TELEPHONE DIAL ALARM DEVICE

Filed Aug. 24, 1962 3 Sheets-Sheet 1

INVENTOR
JAMES E. MOORE, JR.

BY Robert M. Dunning
ATTORNEY

Nov. 22, 1966 J. E. MOORE, JR 3,287,500

FIRE-INTRUSION AUTOMATIC TELEPHONE DIAL ALARM DEVICE

Filed Aug. 24, 1962 3 Sheets-Sheet 2

INVENTOR
JAMES E. MOORE, JR.

BY Robert m. Dunning

ATTORNEY

INVENTOR
JAMES E. MOORE, JR.

BY Robert M. Dunning
ATTORNEY

United States Patent Office 3,287,500

Patented Nov. 22, 1966

3,287,500
FIRE-INTRUSION AUTOMATIC TELEPHONE DIAL ALARM DEVICE

James E. Moore, Jr., Ramsey, Minn., assignor to Lindsay Controls, Inc., St. Paul, Minn., a corporation of Minnesota Filed Aug. 24, 1962, Ser. No. 219,209
9 Claims. (Cl. 179—5)

This invention relates to an improvement in fire-intrusion automatic telephone dial alarm device, and deals particularly in dialing a telephone number and transmitting a prerecorded message over the telephone in the event the alarm is triggered.

Various alarm devices have been provided which are designed to transmit a message over a telephone line in the event of an emergency. In most instances, these previous devices comprise mechanical apparatus for rotating the telephone dial in a predetermined pattern. Also, in most instances, these previous devices render the telephone useless for its intended purpose. The devices are also clumsy in nature and difficult to adjust so that the proper number is dialed.

It is an object of the present invention to provide a fire and intrusion alarm system that is so designed that when the device is triggered, it will automatically dial any preset telephone number. If desired, the apparatus may also be used to sound alarm signals which may be either seen or heard. When the alarm is triggered, it starts into operation a transistorized solid state telephone pulsing amplifier which will automatically dial any preset telephone number. For example, the apparatus could dial the fire department, the police department, or any central agency. At the end of the dialing sequence, a prerecorded message, identifying the location of the fire or intrusion, will at that time be automatically reproduced over the telephone line. At the end of this sequence, the system will automatically cut itself off and release the telephone.

It is a feature of the present invention that the apparatus in no way interferes with the normal operation of the telephone and may completely by-pass the telephone itself and may direct the message to a desired receiving station independently of the telephone itself.

A further feature of the present invention resides in the provision of a means of transmitting a predetermined telephone message through the use of a dual track tape recorder, and in the provision of a means for selecting the proper track to be transmitted depending upon the nature of the alarm. For example, if the apparatus is to be used as a fire alarm, the apparatus may dial the number of the fire department and give the location of the fire. On the other hand, if the alarm is triggered by an intruder illegally entering the premises, the same apparatus may automatically dial the police department and give the proper information to this agency.

A further feature of the present invention resides in the fact that the device may be used with or without a visible or audible alarm. When the device is in use as a fire alarm, it is usually desirable to sound an audible warning device to give warning to persons on or around the premises of the fire. In the event the apparatus is triggered by an intruder, it may be desired to turn on lights, or to turn on a different type of audible alarm signal or it may be preferred to silently transmit the telephone message to the Police Department so that they may take the intruder unawares.

A further feature of the present invention resides in the fact that the apparatus may, if preferred, be used in conjunction with other types of triggering devices such as temperature control devices for sounding an alarm in the event the temperature within the building drops beneath a predetermined temperature, indicating a failure in the heating system.

These and other objects and novel features of the present invention will be more clearly and fully set forth in the following specification and claims.

In the drawings forming a part of the specification;

Figure 1:
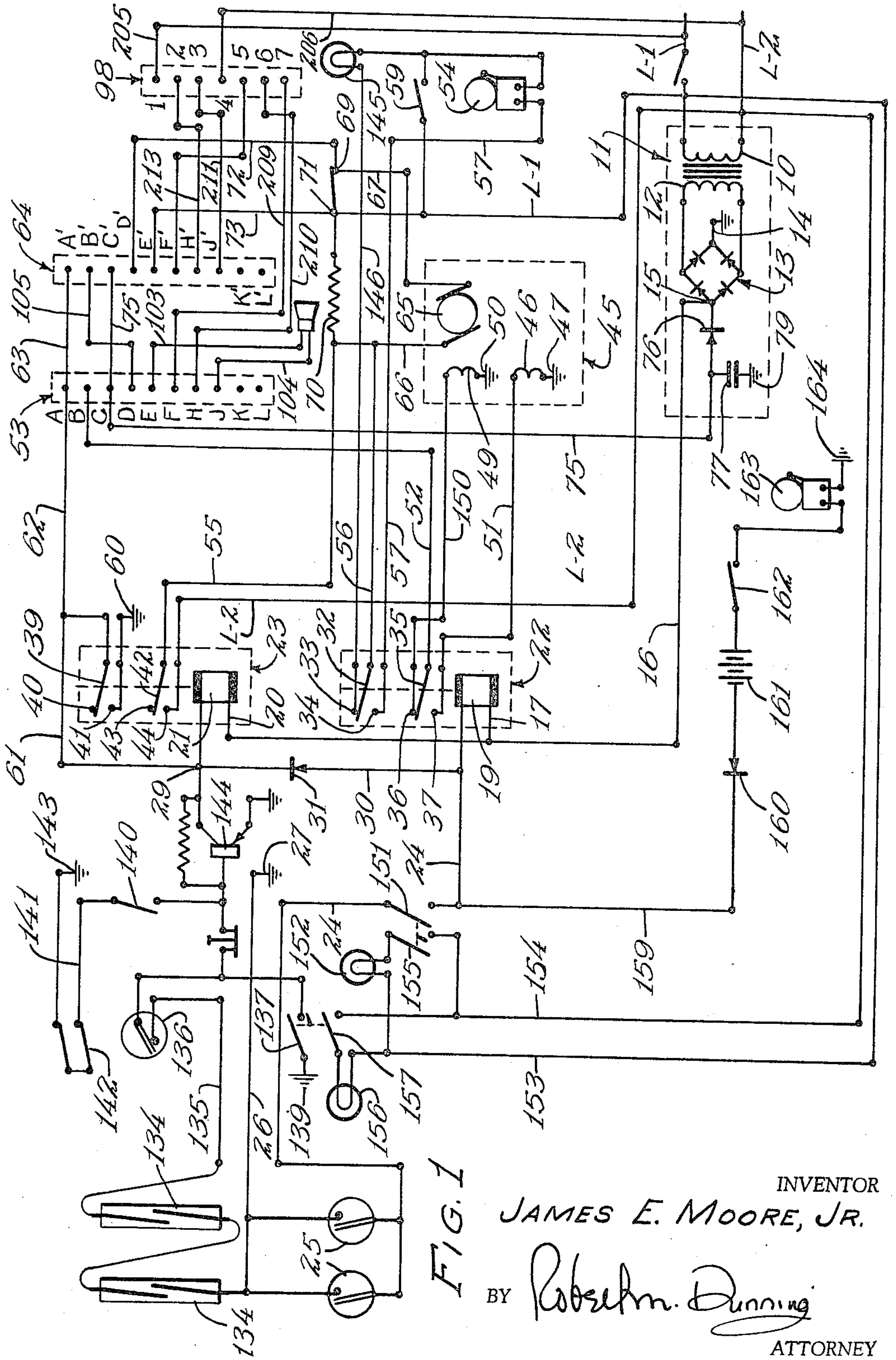
FIGURE 1 illustrates a typical circuit, omitting the sound preamplifier and driver and also omitting the pulsing actuator so that these parts may be shown in larger dimensions.

The system includes a transformer type power supply for safety against fire and shock. The line wires L–1 and L–2 are connected to the primary coil 10 of a transformer 11. The secondary 12 of the transformer 11 is connected to opposite sides of a full wave diode bridge 13. One of the remaining opposed terminals of the bridge is connected to ground as indicated at 14. The opposite terminal of the full wave diode bridge 13, this terminal being indicated by the numeral 15, is connected by a conductor 16 to one terminal 17 of a relay coil 19, and the conductor 16 also leads to one terminal 20 of a second relay coil 21. The relays contained in the coils are indicated in general by the numerals 22 and 23 respectively.

The second terminal of the relay coil 19 is connected by a conductor 24 to one terminal of a series of thermosensors 25, the other terminals of which are connected by a common conductor 25 to ground as indicated at 27. These fire sensors 26 consist of thermosensitive devices designed of bimetallic products to operate on a temperature rise of between one hundred twenty-eight to one hundred thirty-eight degrees F. These devices are strategically located throughout the building or house to be protected. The location should be selected as those which would be most vulnerable for fires and the sensors should be mounted from six to eighteen inches below the ceiling line in order to detect a heat rise in the room in a minimum length of time.

The fire sensors should have an opening temperature of around ninety degrees F. and the bimetallic unit will be so housed that it can readily be surface mounted. The sensing area is usually protected by a flat cap of aluminum. The contact of the sensors, which are not illustrated in the diagram, are preferably provided with normally open gold contacts. Thus the circuit through the relay coil 19 will remain deenergized and the circuit to ground will remain open unless one of the sensors is subjected to sufficient heat.

The second terminal 29 of the relay coil 21 of relay 23 is connected by a conductor 30 to the conductor 24. As a result, the relay 23 is energized each time the relay 22 is energized. However, the conductor 30 includes a diode 31 which makes it possible for the relay 23 to be independently energized for purposes which will be later described.

Each of the relays 22 and 23 includes two sets of contacts, each set comprising a single pole double throw switch. The relay 22 includes a first set of contacts including a center blade 32 normally biased into engagement with an upper contact 33, and which is engageable upon energization of the relay with a lower contact 34. The second set of contacts in relay 22 includes the center blade 35 which is normally biased into engagement with the upper contact 36, and which is engageable with a lower contact 37 upon energization of the relay.

The second relay 23 includes a switch blade 39 which in its upper position is engaged with an open contact 40 and which in its energized position is in engagement with a lower contact 41. The second set of contacts in the relay 23 includes a center blade 42 which is normally engaged with the open contact 43 and in its lower position is engaged with the contact 44.

The sound signal for the apparatus includes a tap deck indicated in general by the numeral 45, and which includes a first head 46, one terminal of which is grounded as at 47, and a second tape head 49, one terminal of which is grounded as indicated at 50. When the fire detector relay 22 is actuated by the connection of the conductor 24 to ground at 27 through conductor 26 and one of the sensors 25, the switch blade 35 moves into engagement with the contact 37 closing a circuit from ground through the tape head 46, conductor 51, relay contacts 37 and 35, and conductor 52 to the B terminal of the terminal strip 53 to which the pulsing amplifier is connected as will be later described. At the same time, the switch blade 32 closes a line voltage (such as 115 volts) circuit to an audible fire alarm signal 54. This circuit also extends through the contacts of the relay 23 which, as was described, closes simultaneously with the fire detector relay 22. The line wire L–2 is connected to the contact 44 of the relay 23, and the circuit continues through the relay switch blade 42, the conductor 55, and conductor 56 to the switch blade 32. The circuit continues through the contact 34 and conductor 57 to the fire alarm bell or buzzer 54, the other terminal of which is connected through the switch 59 to the line wire L–1. Obviously, the switch 59 may be opened if no audible or visible alarm is to be given.

A holding circuit is provided for the relays 22 and 23, this circuit extending from the contact 41 which is grounded as indicated at 60 through the relay switch blade 39 and conductor 61 to the relay terminal 29 thus holding the relays closed until they are manually opened. The switch blade 39 and contact 41 also provides a ground circuit through the conductor 62 to the A terminal of the pulsing preamplifier terminal strip 53 which serves in the manner which will be described, to activate the preamplifying unit. A conductor 63 connects the A terminal of the terminal strip 53 to the corresponding A′ terminal of the terminal strip 64 to which the pulsing amplifier is connected as will be later shown. Thus both of the units are activated by the closing of this ground circuit.

The closing of the relay 23 also serves to activate the tape deck motor 65 of the tape deck 45. The current flows from L–2 through contact 44, switch blade 42, conductor 55, and conductor 66 to one terminal of the motor 65. The other terminal of the motor 65 is connected by conductor 67 to one terminal 69 of a normally closed time delay relay 70. The other terminal 71 is connected to line wire L–1 to complete the circuit.

The time delay relay 70 functions to close the circuit for the tape deck motor for a predetermined minimum time such as, for example, three minutes. These contacts will then open and the circuit to the tape deck motor will be opened unless a parallel holding circuit remains closed. This additional holding circuit will be later described but includes a conductor 72 leading from the conductor 67 to the D terminal of the terminal strip 64, and a conductor 73 leading from L–1 to terminal E′ of the terminal strip 64.

Figure 2:
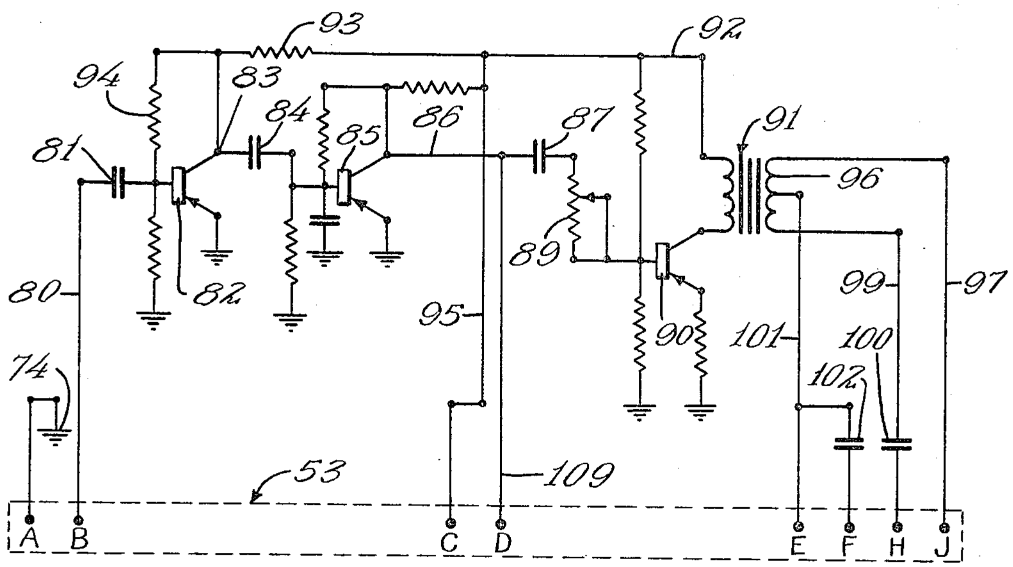
FIGURE 2 is the wiring diagram of the preamplifier and driver which in actual practice is plugged into the circuit board of the remainder of the circuit shown in FIGURE 1.

As has been indicated, in the particular arrangement illustrated, the pulsing preamplifier and driver is plugged into the terminal strip 53, and the circuit of this device is best illustrated in FIGURE 2. As the unit is separate, terminal A of the contact strip 53 is connected to the ground of the unit as indicated at 74. A voltage to the preamplifier is supplied from the terminal 15 of the full wave diode bridge 13 through a conductor 75 leading to the C terminals of both terminal strips 53 and 64, this circuit being isolated from the relay circuit by a diode 76 which, in actual practice, provides pure filtered D.C. current of approximately eighteen volts off of the capacitor 77 which is grounded at 79. As indicated in FIGURE 2, when the circuit to the ground 74 is closed, the unit is in position to accept signals from the tape deck head 46 through the terminal B. The signal from terminal B leads through conductor 80 including a condenser 81 to the base of the transistor 82 which amplifies the signal. The collector 83 of the transistor 82 is connected through condenser 84 to the base of a second transistor 85. At the collector of the transistor 85, the signal is transmitted through the conductor 86 including the condenser 87 and variable resistance 89 to the base of a third transistor 90. The transistor 90 serves as an audio amplifier and the collector of this resistor which is connected to the input coil of an output transformer 91. The other terminal of the transformer coil is connected by the conductor 92 to the conductor 80 through suitable resistors 93 and 94. The filtering and balancing network is illustrated, but not described in detail. The operating voltage from terminal C is connected by conductor 95 to the conductor 92 connected to the transformer coil.

The output coil 96 of the transformer 91 is connected by conductor 97 to the J terminal of the terminal strip 53 while the other end of the coil 96 is connected by conductor 99 including the condenser 100 to the H terminal of this terminal strip. The center tap of the coil 96 is connected by conductor 101 to the E terminal of the terminal strip, and also through the condenser 102 to the F terminal thereof. As is indicated in FIGURE 1 of the drawings, terminals F and H lead to the telephone lines through terminals 6 and 7 of a terminal strip 98. As a result, the amplified sound is transmitted to the telephone line. As is also indicated in FIGURE 1 of the drawings, the terminals E and J are connected by conductors 103 and 104 to a monitor speaker 108.

The pulsing tone and holding tones that will appear on the tape are of a high frequency, approximately four thousand cycles per second, so that reproduction of these tones is attenuated to the point that they do not create any interference with the voice message.

Figure 3:
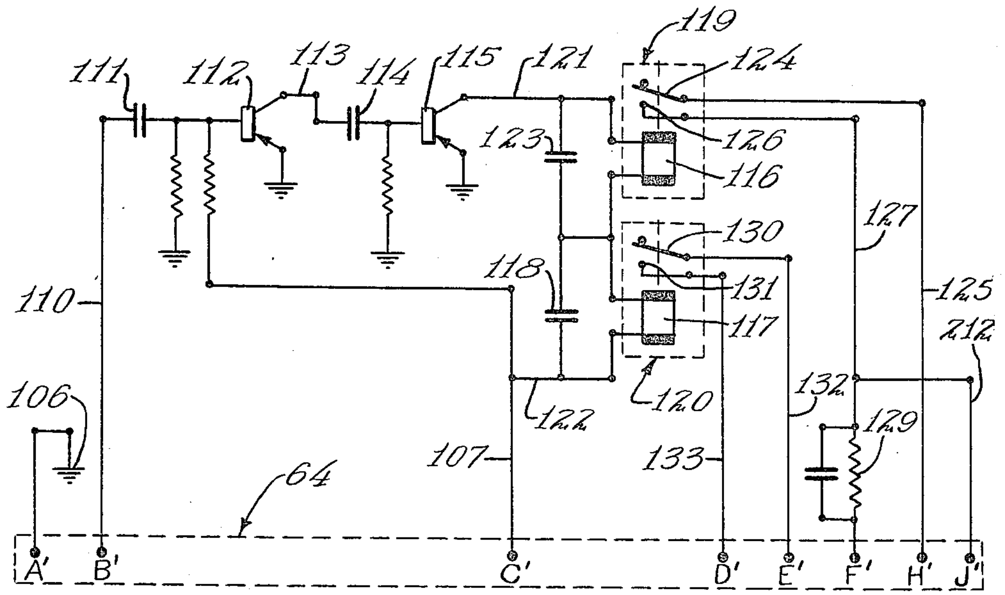
FIGURE 3 is the wiring diagram of the pulsing actuator and holding circuit which in actual practice is also plugged into the circuit board of the circuit shown in FIGURE 1.

The pulsing amplifier is indicated in FIGURE 3 of the drawings, and is in actual practice a separate unit which may be plugged on to the terminal strip 64. In order to distinguish the terminals of the strip 64, the letters will be primed. As indicated in FIGURE 1, terminal A is connected to terminal A′ by the conductor 63. Output terminal D is connected to input terminal B′ by a conductor 105. Terminal C is connected to terminal C′ by the extension of the conductor 75. Terminals F′ and H′ are connected to the telephone line terminals 2 and 5 of terminal block 98.

Terminal A′ is connected at 106 to the ground of the unit. Power is supplied from terminal C′ through the conductor 107. The signal input enters at B′ which is connected by the conductor 105 to terminal D. Referring back to FIGURE 2, it will be noted that the terminal D is connected by conductor 109 to the collector of the second transistor 85, the signal being divided at this point between the audio portion of the signal and the pulsing portion of the signal.

The incoming signal is transmitted by conductor 110 through the condenser 111 to the base of the transistor 112. The collector of the transistor 112 is transmitted through conductor 113 and condenser 114 to the base of the transistor 115. This transistor 115 serves as a solid state switch. The current at the collector of the transistor 115 is sufficiently high to actuate both coils 116 and 117 of a pair of relays 119 and 120. The relay 119 comprises a pulsing relay while the relay 120 serves as a holding relay.

The relay coils 116 and 117 are connected in series between the collector conductor 121 and a conductor 122 leading to the current supply line 107. The pulsing relay 119 is sensitive to on-off tone signals as controlled by transistor switch 115, and is further controlled by the parallel capacitor 123. The normally open relay switch blade 124 is connected by the conductor 125 to terminal H′ which is connected through terminal strip 98 to one telephone line. The contact 126 is connected by conductor 127 to the terminal F′ and through the terminal strip 98 to the other telephone line through a telephone impedence matching network 129. As "off" pulses of the tone signal are applied, this in turn breaks the telephone line matching network at the proper time intervals necessary to perform the pulsing action into the telephone line and will provide dialing of a predetermined number. On completion of its pulsing, the telephone matching network function is actuated by the holding tone recorded on the tape which retains the telephone line intact through the waiting period for listening, as well as through the period necessary for the message.

This arrangement is of importance, as previous to activation of the alarm system, and upon completion of the action of the system, the telephone line is completely free of any loads and/or voltages. Thus no interference in any manner is created regarding the normal use of the telephone line.

The holding relay 120 and its parallel condenser 118 controls a pair of contacts which are parallel with the contacts 69 and 71 of the time delay device 70 controlling the duration of energization of the tape deck motor 65. The purpose of this device is to prevent the cut-off of voltage to the tape deck motor during the pulsing and message action. In other words, if the message requires a longer time than the timed delay relay 70 provides, the holding relay will continue to maintain a circuit to the motor until the completion of the message. The holding relay 120 is not sensitive to the pulsing action due to the large size of the capacitor 118. Therefore, it will maintain its holding action throughout the sequence of events.

The relay includes a movable contact 130 normally spaced from the fixed contact 131, the two contacts being connected by conductors 132 and 133 to the terminals D′ and E′. As was described in conjunction with FIGURE. 1, these terminals are connected by conductors 72 and 73 to opposite sides of the contacts 69, 71 of the time delay relay.

In actual practice, the time delay relay comprises a thermally actuated switch which operates normally closed contacts, the switch requiring a predetermined time period to operate, and open.

The intrusion sensors 134 are preferably of a reed switch design. Each of these units includes contacts which include normally spaced reeds which are activated by the use of a small permanent magnet brought into close proximity to the reed switch. When the magnet is close to the switch, the magnetic field temporarily magnetizes the tips of the reed blades and thus causes them to attract each other. This attraction causes the blades to make a temporary contact. Upon removal of the permanent magnet, the blades will spring apart and open the circuit. The units are hermetically sealed, and are efficient for millions of operations.

The sensor units are mounted in strategic locations at various windows and door openings throughout the building or house. The switches are permanently mounted on the door or window frame and are connected in series with each other. In usual practice, both the fire sensors or intrusion sensors are connected by a three wire cable, the cable including the wires 24 and 26 and the third wire 135, the series circuit being between common wire 26 and the wire 135. This circuit is normally closed to ground at 27 when all of the reeds are actuated.

Upon any small movement of the door or window, of approximately one inch or more, the permanent magnets which are mounted in close proximity to the reed switches on the movable part of the window or door move away from the switches, thus opening the circuit and actuating the alarm.

If desired, the conductor 135 may include a normally closed thermostatic switch 136 which is constructed to open at a predetermined low temperature, as for example forty-five degrees F. or below. This device may be similar to the fire sensor, but with a normally closed contact, and will be inserted in series with the series intruder unit. This unit is preferably located within the building to indicate when the predetermined low temperature is reached, indicating a failure in the heating system.

In the particular arrangement illustrated, the switch 136 would activate the intruder channel on the tape device, and would in turn dial the police or any predetermined number. In such arrangement, the prerecorded message should indicate that the alarm may either be a freeze alarm or an intrusion alarm.

The intrusion system includes a normally closed switch 137 which is connected to ground at 139. When the switch 137 is closed, the system is cut off and not in operation. When the system is to be used, the switch 137 is opened.

The circuit is also preferably controlled so that it may be set for intrusion before leaving the premises, and then to leave the premises without actuating the alarm. This includes a normally open switch 140 connected to the conductor 135 and connected by a conductor 141 to a normally closed switch 142 which returns to the circuit ground at 143. By closing the switch 140 before leaving the premises, and opening the switch 142 after leaving the premises, the ground circuit is maintained while leaving the premises even though one of the intruder sensors is temporarily open. The switch 142 is preferably key actuated.

The intruder sensor input circuit feeds directly into the base of a solid state transistor switch 144. As has been described, when the intruder circuit is in operation, the switches 134 are normally closed so that the circuit is a normally grounded circuit, grounding the base of the transistor 144 and cutting off the solid state switch formed thereby. When any of the switches 134 are opened, due to the opening of a door or window by the intruder, the transistor will conduct, and will in turn activate the relay 23 which is in effect the intruder relay. As soon as the circuit is opened, the relay switch blade 39 will contact the contact 41, and close a circuit from the ground at 60 through the conductor 61 to the relay coil terminal 29 of the coil 21. As the other side of the coil 21 is connected by conductor 16 to the circuit supply, a holding circuit is provided maintaining the relay in circuit until the circuit is manually broken. Thus, if the intruder sensor is restored to its original position, such as would be the case if the intruder opened and then reclosed a door or window, the alarm system will not be cut off.

The energization of the relay 23 also connects the switch blade 42 to the contact 44 thereby closing a circuit to an intruder alarm light 145. This circuit extends from line wire L–1 through the switch 59, the alarm light 145, and conductor 146 which leads to the contact 33. As the relay 22 is not energized due to the presence of the diode 31, the circuit continues through switch blade 32, conductors 56 and 55 to the switch blades 42 of relay 23, and then through contact 44 which is connected to the line wire L–2, thus directing 115 volt current to the alarm.

When the circuit through an intrusion sensor 134 is broken and the relay 23 actuated, the output of the tape head 49 is also directed to terminal B of the terminal block 53. This circuit extends from ground 50 through the tape head 49, conductor 150, relay terminal 36, relay switch blade 35, and conductor 52 to the terminal B thus acting to transmit the message picked up from the tape by the tape head 49. Simultaneously, the operation of the relay 23 also closes a circuit to the tape deck motor 65 from L–1 through the time delay relay switch 71 to the terminal 69, and through conductor 67 to one terminal of the motor 65. The other motor terminal is connected by conductor 66 and 55 to relay switch blade 42 and the relay terminal 44 which is connected to L–2 to complete the circuit.

The fire alarm circuit is turned on and off by means of a switch 151 in the conductor 24 leading to the sensors 25. A pilot light 152 is provided between conductors 153 and 154 connected to line wires L–1 and L–2 and controlled by a switch 155. The switches 151 and 155 are actually a double pole single throw switch.

A second pilot light 156 is connected between the line wire conductors and is controlled by a switch 157. This switch 157 is actually operable in unison with the intrusion alarm control switch 137 as a double pole single throw switch. The pilot lights 152 and 156 thus indicate when either or both systems are in operation.

An alternate fire detection standby is provided in case of power failure. A conductor 159 including a diode 160 connects conductor 24 with a battery 161. The other battery terminal extends through the control switch 162 and alarm bell 163 to ground at 164. When the emergency switch 162 is closed, the closing of any sensor switch 25 will close the circuit from ground 27, conductor 26, sensor 25, conductor 24, conductor 159, battery 161, and bell 163 to ground at 164.

Figure 4:
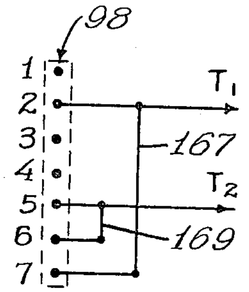
FIGURE 4 shows the wiring of the output plug when the automatic pulsing unit is employed.

FIGURE 4 shows the arrangement of terminal connectors employed when the system described is in use. As shown in FIGURE 1, conductors 165 and 166 lead from the terminals F and H of terminal strip 53 to terminals 7 and 6 of terminal strip 98 (which is in practice a plug). The terminals F' and H' of terminal strip 64 are connected to terminals 2 and 5 of terminal strip 98. As shown in FIGURE 4, the detachable portion of the terminal strip 98 merely connects terminals F and F' to telephone line wire T–1 and terminals H and H' to telephone line T–2. This is accomplished by connecting terminals 2 and 7 by conductor 167 and connecting terminals 5 and 6 by conductor 169.

In the operation of the apparatus, when one of the fire sensors 25 is actuated to close the circuit therethrough a circuit is closed from ground 27 to conductor 26 and the closed sensor 25 to conductors 24, 30 leading to one terminal of each of the relays 22 and 23. The other terminal of these relays is permanently connected by conductors 16 and 20 to the low voltage current supply.

When the switch 59 is closed, the operation of the relay switch blade 32 closes a circuit which has been described to the alarm bell 54. The switch blade 39 of relay 23 closes a holding circuit to both relays 22 and 23 maintaining these relays closed until the circuit is manually opened. Operation of the switch blade 42 of relay 23 closes a circuit to the drive motor 65 of the tape deck 45 starting the tape in motion. Actuation of the switch blade 35 of relay 22 closes a circuit from the tape head 46 to the pulsing preamplifier shown in FIGURE 2.

The signal picked up by the tape head 46 includes both an audible signal and a high frequency inaudible signal, the latter being used to dial the telephone number and to maintain the telephone line in circuit during a waiting period as well as for a message. The pulsing tones are transmitted to the pulsing amplifier illustrated in FIGURE 3 which includes a transistor switch which operates a pulsing relay 119 and a holding relay 120 in accordance with the signal from tape. The pulsing relay is sensitive to off-on tone signals. The pulsing relay when closed activates the telephone impedence matching network to make and break the telephone matching network at proper time intervals necessary to perform the pulsing action on to the telephone line to dial a preselected number. Upon completion of its pulsing, the telephone matching network function is contained by the holding tone which retains the telephone line intact throughout the waiting period for listing as well as the period necessary for the message. At the completion of the message and discontinuation of the holding tone, the holding relay 120 will open and restore the telephone line to its normal condition.

The holding relay coil 117 performs the function of closing a holding circuit applying voltage to the tape deck motor during the pulsing and message action thus avoiding opening of the circuit to the tape deck motor by the time delay relay 70. The holding relay 120 is not sensitive to the pulsing action due to the large size of the capacitor 118, and therefore will maintain its holding action throughout the sequence of events.

The operation of the intruder sensors 134 functions through a different tape head 49 to transmit a signal from the tape to a telephone number which may be the same or which may be different from that picked up by the tape head 46. The circuit through the intruder sensors 135 is normally closed to ground preventing the actuation of the solid state transistor switch 144. When this circuit is broken, the switch produces a circuit to open the relay 23 as described. When the relay 23 is actuated, a circuit is closed through relay contact 44 and switch blade 42 and through the time relay switch 71 to the tape deck motor 65 energizing this motor for a predetermined period of time. Simultaneously, a circuit is closed through the relay switch blade 35 of relay 22 to the input of the pulsing preamplifier shown in FIGURE 2. A circuit is also closed to the signal 145 and to both the pulsing preamplifier and pulsing amplifier to energize these units. This circuit extends through normally closed switch blade 32 of unenergized relay 22 as well as switch blade 42 of relay 23. Furthermore, the engagement of relay switch blade 39 with grounded contact 41 of relay 23 closes the circuit to the pulsing preamplifier (FIGURE 2) and pulsing amplifier (FIGURE 3).

When the foregoing circuits have been closed by the intruder relay 23, the tape deck starts into operation to transmit a signal to the preamplifier from the tape head 49, and to the pulsing amplifier which acts to "dial" the predetermined number by making and breaking the telephone circuit in the same way the telephone dial would do so. After this number is dialed, the holding tone will hold the telephone line in service until the desired message recorded on the tape has been transmitted over the telephone line. After the message has been repeated, the requisite number of times, the holding tone will cease, and the telephone circuit will be closed either by action of the time delay relay 70 or by the opening of the holding relay 120, whichever occurs latest.

Figure 5:
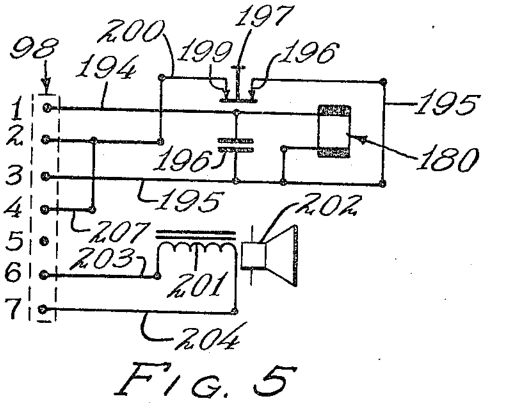
FIGURE 5 shows the output plug which may be substituted for that shown in FIGURE 2 when a mechanical pulsing unit is employed with the system.
Figure 6:
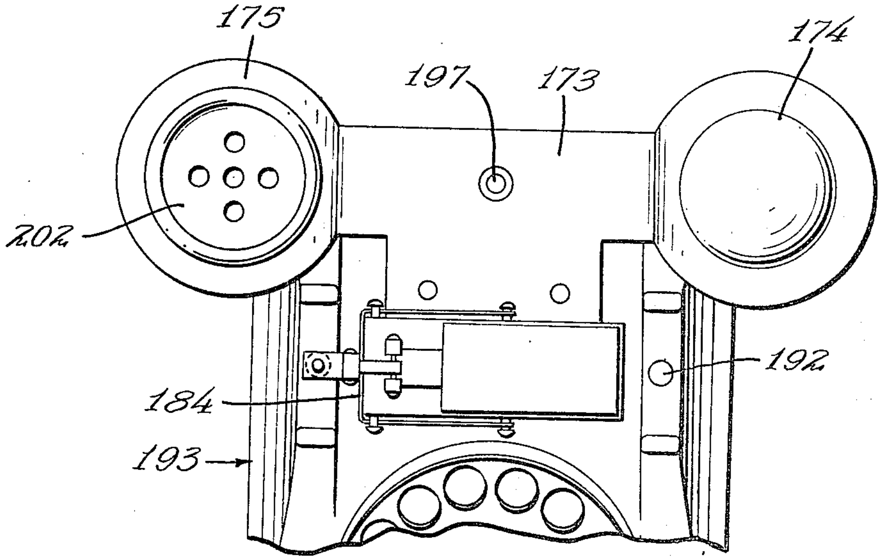
FIGURE 6 is a plan view of a mechanical pulsing device which may be attached to the telephone for use in conjunction therewith.
Figure 7:
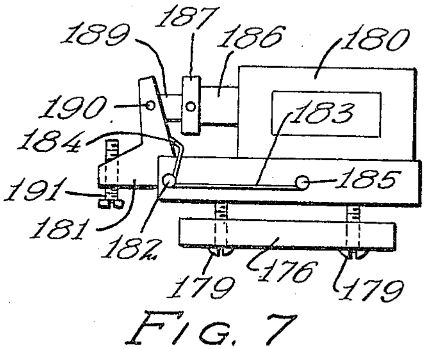
FIGURE 7 is an elevational view of the apparatus illustrated in FIGURE 6.

An alternate method of transmitting the message to the telephone is indicated in FIGURES 5, 6, and 7 of the drawings. The apparatus shown in these figures plugs into the terminal strip 98 in place of the arrangement shown in FIGURE 4, the remainder of the circuit remaining intact.

Figure 8:
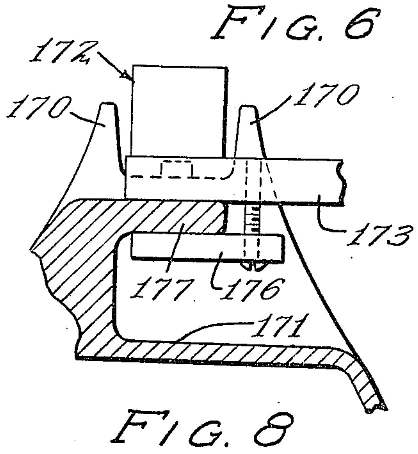
FIGURE 8 is a sectional view through a portion of a conventional dial telephone, showing the manner in which the attachment is secured thereto.

The particular arrangement illustrated is designed as an attachment for the ordinary desk telephone. Obviously, the method of attachment in the specific design of the apparatus may be materially varied without changing the system of operation. Most present day desk phones include two pairs of spaced upwardly projecting prongs 170 (see FIG. 8) on opposite sides of the center of the phone body which act as a cradle for holding the hand piece. Beneath this cradle formed by the projections 170, the phone bodies are normally provided with a rearwardly opening pocket 171 into which the fingers may be inserted for lifting the telephone. In the present arrangement, the dialing apparatus which is indicated in general by the numeral 172 is attached.

The apparatus 172 includes a T shaped base plate 173 having rounded ends on the cross bar of the T which are designed to accommodate the receiver and transmitter respectively of the telephone hand set which is omitted so that the structure may be illustrated. The ends 174 and 175 are preferably convex on their upper surface and are shaped to accommodate the receiver and transmitter to form a cradle for the hand set.

The base plate 173 is held in place by means of a clamping plate 176 which extends into the pocket 171 and which may clamp the base plate to the rearwardly projecting lip 177 forming the upper surface of the pocket. The clamping plate is clamped toward the base plate 173 by means of screws 179 or other suitable means.

A solenoid 180 (see FIG. 7) is mounted in any suitable manner upon the base plate in line with the cradle formed by the projections 170. A rocker arm 181 is pivotally connected to the base plate at 182 and is designed to oscillate through a narrow range of angular movement. A generally U-shaped spring 183 includes a cross arm 184 which engages against the rocker arm 180 to urge the rocker arm in a counter-clockwise direction as viewed in FIGURE 7. The spring 183 engages the pivot 182 as a fulcrum, and is restrained by anchoring bolts 185 at its ends.

The relay 180 is provided with a slidable armature 186 which is pivotally connected at 187 to a link 189 which in turn is pivotally connected to the rocker arm at 190. The rocker arm is mounted as a bellcrank lever, with the link 189 connected to one arm of the lever. An adjustment screw 191 projects from the other lever arm and is designed to bear against one of the switch buttons 192 forming a part of the telephone 193 and which in normal operation are engaged by the hand piece of the telephone when the telephone circuit is not in use. Due to the fact that the rocker arm 181 is normally biased in a counter-clockwise direction, the switch buttons are normally held depressed by the rocker arm. The circuit of the automatic pulsing unit is shown in FIGURE 5 of the drawings, this figure showing the terminal strip 98 which is normally in the form of a plug which may be plugged into the terminal strip shown in FIGURE 1 in place of the similar terminal strip 98 illustrated in FIGURE 4 of the drawings. As indicated in this figure, the relay coil 180 is connected by conductors 194 and 195 to terminals 1 and 3 of the strip 98, there being a condenser 196 in parallel with the relay coil. The conductor 195 continues to one terminal 196 of a push button switch 197, the other terminal 199 of which is connected by conductor 200 to terminal 2 of the terminal strip 98. The voice coil 201 of a transducer 202 is connected between conductors 203 and 204 connected to the terminal strip terminals 6 and 7, respectively.

With reference back to FIGURE 1 of the drawings, it will be noted that terminals 1 and 4 are connected by conductors 205 and 206 to the line wires L–1 and L–2. Terminals 2 and 4 of the strip 98 are connected by a conductor 207. When the plug or substitute terminal strip 98 shown in FIGURE 5 is used, certain circuits will function by the apparatus shown in FIGURES 1, 2, and 3 of the drawings which will be described. However, it should first be explained that the push button switch 197 is mounted upon the T-shaped base plate 173 so that when the telephone hand piece is resting upon the cradle formed by the ends 174 and 175 of this device the switch 197 will be opened, and the alarm apparatus will be in operation. If it is desired to use the phone in the conventional manner, it is only necessary to lift the hand piece and the switch 197 will be closed, connecting the telephone circuit to the dial phone in the conventional manner.

The circuits used in conjunction with the apparatus shown in FIGURE 5 are as follows: As shown in FIGURE 1, terminal F of the terminal strip 53 is connected to terminal 7 of the separable terminal strip 98 by the conductor 209. The terminal H of the terminal strip 53 is connected to terminal 6 of the terminal strip 98 by a conductor 210. As has seen previously stated, the terminals F and H are the output audio terminals from the preamplifier illustrated in FIGURE 2, and accordingly the amplified sound from the tape will be carried by conductors 209 and 210 to the conductors 204 and 203 leading to the coil 201 of the transducer 202. Thus the amplified sound will be directed to the transducer or speaker 202 which is mounted in the end 175 of the telephone mouthpiece resting upon the cradle.

The pulsing circuit for "dialing" the correct telephone number is as follows: Terminal 1 of the terminal strip 98 is connected to L–1 by conductor 205. Terminal 1 is connected to one terminal of the solenoid coil 180 by conductor 194. The other terminal of the solenoid 180 is connected by conductor 195 to terminal 3 of the terminal strip 98. As shown in FIGURE 1, this terminal is connected by a conductor 211 to the J terminal of the pulsing amplifier terminal strip 64. As shown in FIGURE 3 of the drawings, the J terminal is connected by a conductor 212 to conductor 127 past the telephone line matching impedence 129. Conductor 127 leads to the contact 126, through the pulsing relay switch blade 124 and conductor 125 to terminal H′ of the terminal strip 64. Terminal H′ is connected to terminal 2 of the terminal strip 98 by a conductor 213. Terminal 2 is connected by the jumper 207 to terminal 4 of the terminal block 95 which is connected by conductor 206 to L–2 thus completing the circuit.

Thus as the relay 116 is operated by pulses from the solid state switch 115, current is opened and closed to the solenoid 180 which alternately swings the rocker arm 181 in a clockwise and counter-clockwise direction. In other words, each time the relay is opened, and the solenoid 180 will open the telephone line momentarily and then close it thereby acting in the same capacity as the telephone dial to call a predetermined number on the telephone circuit. At the completion of the dialing operation, the signal is such as to close the telephone circuit. At this time, the sound which is amplified by the preamplifier shown in FIGURE 2 will be directed to the transducer 202, and an audible signal will be transmitted into the telephone line.

Thus the arrangement illustrated in FIGURES 5–8 accomplishes much the same result as the structure shown in FIGURES 1–4 with the exception of the fact that in the first described arrangement pulses from the relay 119 are transmitted directly to the telephone line to accomplish the dialing operation, while in the arrangement illustrated in FIGURES 5–8, the dialing is accomplished by use of the buttons which normally form the means of opening the telephone circuit when the hand piece is in place. Both systems have their advantages and disadvantages, the first arrangement being somewhat simpler but requiring an actual wiring connection to the telephone circuit, while the second is somewhat more complicated but provides an attachment which can be secured to any telephone and can be detached at will, and does not actually connect to the telephone circuit wiring.

Both systems, on completion of their operation, open the telephone line, thus restoring it to normal.

In accordance with the Patent Statutes, I have described the principles of construction and operation of my improvement in Fire-intrusion Automatic Telephone Dial Alarm Device, and while I have endeavored to set forth the best embodiment thereof, I desire to have it understood that changes may be made within the scope of the following claims without departing from the spirit of my invention.

I claim:

1. A dual alarm system for use with a dial telephone circuit including:

means for coupling to a source of a.c. power;

means for coupling to a source of d.c. power;

a magnetic reproducing unit for alternatively reading a selected one of at least two messages pre-recorded on a dual channel recording tape, each of said messages including manifestations of a telephone number to be dialed, said reproducing unit including a tape drive motor and first and second alternatively operable transducers, each of said transducers associated with a respective one of said dual channels;

a first sensing circuit including at least a first sensor for detecting a first abnormal condition, a first relay coupled intermediate said first sensor and said means for coupling to a source of d.c. power for activating said first relay when said first sensor detects said first abnormal conditions;

a second sensing circuit including at least a second sensor for detecting a second abnormal condition, a second relay coupled intermediate said second sensor and said means for coupling to a source of d.c. power for activating said second relay when said sensor detects said second abnormal conditions;

circuit means couplied intermediate said first and second relays for activating said second relay when said first relay is activated, said circuit means including inhibiting means for maintaining said first relay inactive when said second relay is activated;

a pulsing circuit for coupling to a telephone line for providing a series of pulses at intervals correpsonding to those produced by a telephone dial and indicative of said telephone numbers to be dialed, said pulsing circuit including means for making and breaking the telephone circuit;

a first transducer selection circuit coupled to said first transducer and to said pulsing circuit, including a first normally open switch activated by said first relay for providing signals to said pulsing circuit for dialing a first number indicative of said first abnormal condition;

a motor activating circuit coupled to said tape drive motor and said means for coupling to a source of a.c. power, including a first normally open switch activated by said second relay for providing said power to said tape drive motor;

means for receiving a reference potential;

a latching circuit coupled to said second relay and said means for receiving a reference potential and including a first normally open switch actuated by said second relay, said latching circuit for maintaining said second relay in the activated state; and a second transducer selection circuit coupled to said second transducer and said pulsing circuit including a first normally closed switch actuatable by said first relay, and operative when said first relay is inhibited by said inhibiting means from becoming activated for providing signals to said pulsing circuit from said second transducer for dialing said second number indicative of said second sensed abnormal condition.

2. The structure of claim 1 and in which the second sensor circuit includes a series of normally closed sensors and includes a solid state transistor switch which closes the circuit to the second relay when circuit through one of the normally closed sensors is opened.

3. The structure of claim 1, and including a fire alarm circuit including an alarm signal, a normally closed switch actuated by said first relay, and a source of current supply.

4. The structure of claim 2 and in which one of the sensors in the second sensing circuit includes a normally closed thermostatic switch which opens when subjected to a predetermined subnormal temperature.

5. The structure of claim 1 and in which said motor activating circuit includes a time delay switch capable of opening the motor circuit after a predetermined time interval.

6. An alarm system as in claim 1 wherein said pulsing circuit includes signal amplifier means for amplifying signals provided by said first and second transducer selection circuits.

7. The structure of claim 6 and including an audio amplifier connected to said signal amplifier means and a sound transmitter connected thereto for transmitting an audible signal to the telephone circuit while said telephone circuit is held closed by said means for making and breaking the telephone circuit.

8. An alarm system as in claim 6 including a solid state transistor switch coupled to said signal amplifier means, said transistor switch operating in an active current conducting state in response to one of said signals and in an inactive current conducting state in response to others of said signals; and a pulsing relay coupled to said solid state transistor switch, said pulsing relay being activated in response to said active current conducting state and deactivated in response to said inactive current conducting state for providing signals to the telephone line.

9. The structure of claim 8 and in which said motor activating circuit includes a second normally open switch, and further includes means actuated by said solid state transistor, switch and sensitive to the signal from the tape to maintain said second normally open switch in the motor circuit closed for the duration of the signal.

References Cited by the Applicant

UNITED STATES PATENTS

| | | | |
|---|---|---|---|
| 2,998,489 | 9/1961 | Riesz | 179—6 |
| 3,095,478 | 5/1963 | Adams | 179—5 |
| 3,109,894 | 11/1963 | Humphrey | 179—6 |

BERNARD KONICK, *Primary Examiner.*

IRVING SRAGOW, *Examiner.*

G. LIEBERSTEIN, *Assistant Examiner.*